June 24, 1969     K. M. PRUETT     3,451,428
MULTI-THROW VALVE
Filed Nov. 14, 1966
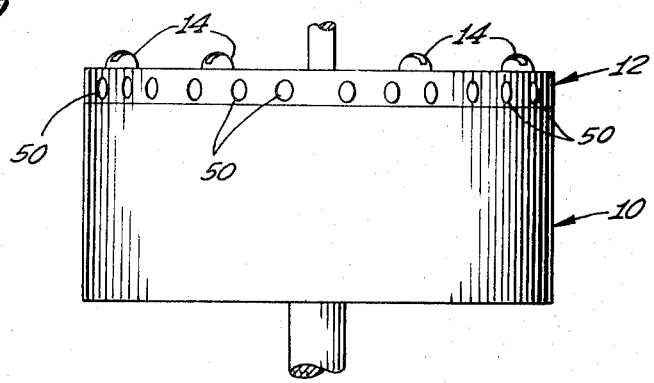
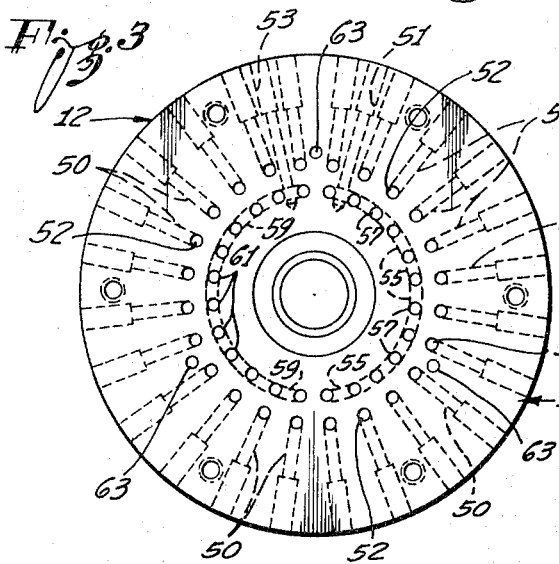
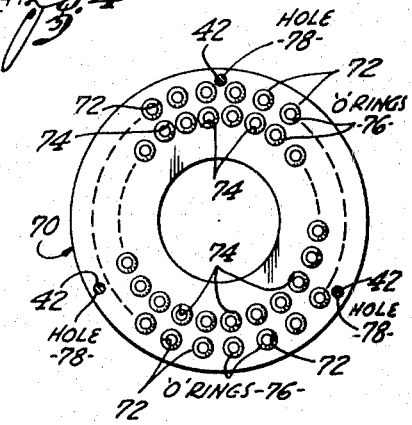
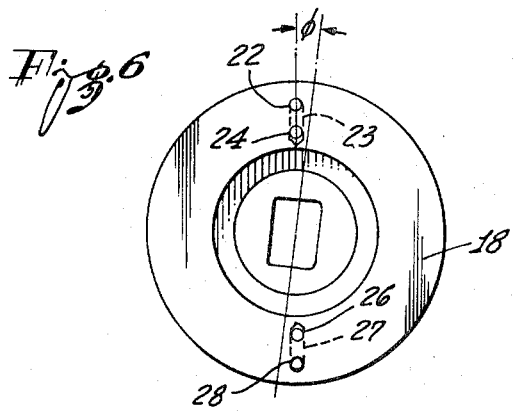
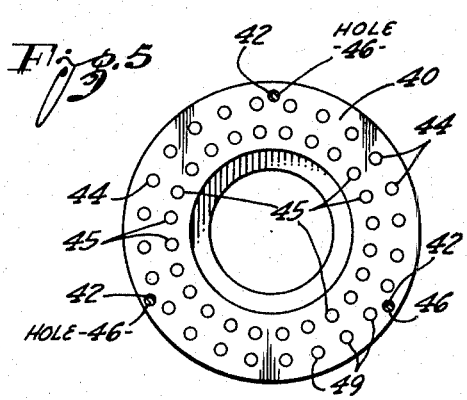
INVENTOR:
Kenneth Max Pruett
By Warren T. Jessup
ATTORNEY INVENTOR:
Kenneth Max Pruett By Warren T. Jessup
ATTORNEY

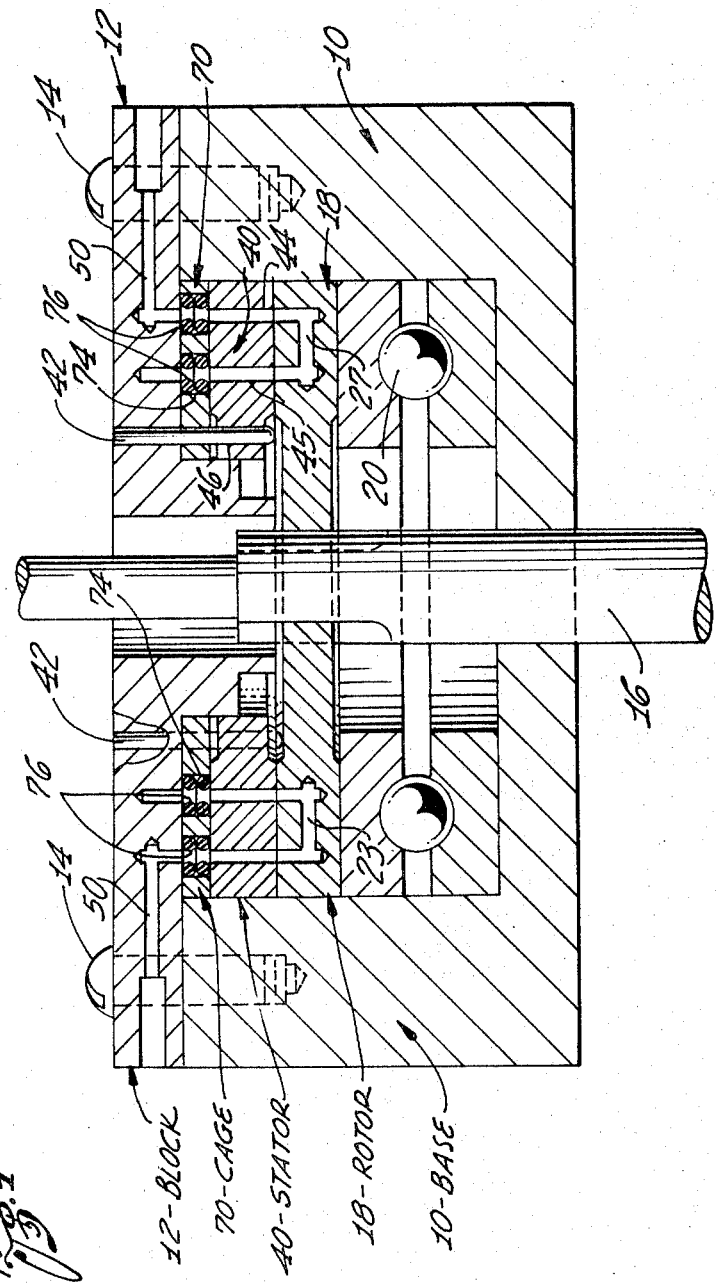

United States Patent Office 3,451,428
Patented June 24, 1969

3,451,428
MULTI-THROW VALVE
Kenneth Max Pruett, San Diego, Calif., assignor to
J. C. Pemberton, San Diego, Calif.
Filed Nov. 14, 1966, Ser. No. 594,093
Int. Cl. F16k *11/02;* F15c *3/00*
U.S. Cl. 137—625.46                       3 Claims

ABSTRACT OF THE DISCLOSURE

An improved fluid valve assembly is provided which is capable of performing complex fluid switching operations, these operations being analogous to the electrical switching operations performed by electrical wafer switches. The valve includes a rotor and a stator which present annular faces to one another, and a matrix of ports and channels is provided so that fluid switching may be achieved as the rotor is turned.

---

The present invention relates generally to valves of the general type disclosed, for example, in United States Patent 3,246,667.

The invention relates more particularly to improved fluid valves which may be used to perform complex fluid "switching" operations analogous to the electrical switching operations performed by electrical wafer switches. That is, the improved valve of the present invention, in one of its aspects, may be considered as a pneumatic analogy of the electric wafer switch.

The improved valve to be described herein may also be used in conjunction with a pressure measuring device to serve to connect the device selectively to a series of conduits leading to distant pressure sources.

The valves, as will be described, may be constructed, for example, as single or multiple "pole" and as multiple "throw" for each pole for complex fluid switching.

The valve of the invention, like the valve described in the aforesaid patent, employs a pneumatic force balance principle which allows this wafer valve to operate at high pressures without failure caused by the rotor being "blown" away from the stator. The stator is caused to "float" between a stationary block and the supported rotor.

In use, electrical wafer switches may be mounted on the same shaft as the fluid switch wafers of the present invention, so as to provide corresponding electrical controls and/or indications.

In the embodiment of the invention to be described, all the external connections to the wafer fluid switching valve are brought into the stationary block. This facilitates coupling the valve into the system to be controlled thereby.

Moreover, in the embodiment to be described, the interfaces between the rotor and stator present circular ports to one another. This is an important feature of the present invention. All attempts to seal effectively this general type of valve in the past has met with failure. This is because the prior art constructions included interfaces with arcuate channels therein. This sealing problem, that has produced a seemingly insurmountable barrier in the past, is successfully solved by the construction of the present invention which utilizes circular ports on the interfaces, and an effective sealing means for such ports.

An object of the present invention, therefore, is to provide an improved valve assembly in which sealing between moving parts is made relatively simple; and which assembly, therefore, may be constructed in a relatively uncomplicated and inexpensive manner.

Other objects and advantages of the invention will become apparent from a consideration of the following description, when the description is taken in conjunction with the accompany drawings, in which:

FIGURE 1 is a side sectional view of a valve assembly constituting one embodiment of the invention;

FIGURE 2 is an elevational view of the improved valve assembly, on a reduced scale;

FIGURES 3–6 are plan views of the various components which make up the valve assembly, scaled to correspond with FIGURE 2.

Figure 7A:
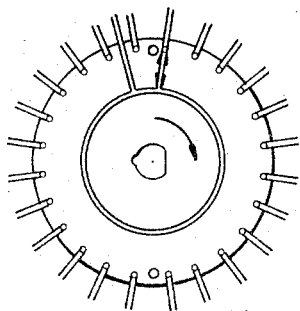
FIGURES 7A–7H are schematic representations of a series of valves constructed to incorporate the principles of the invention.

The valve assembly of the present invention, like the valve described in the aforesaid patent, is of the type including fixed and rotatable plates in order to perform a selective coupling function. As mentioned in the patent, it has long been recognized that in the aforementioned type of valve, that even though relatively thick plates are used, leakage does occur due to distortion of the plates.

For that reason, it has been the practice in the prior art to back up the rotor plate of the valve assembly by relatively strong thrust bearings, and also to include a floating intermediate stator plate between the block and the rotor plate; the stator plate having a surface which mates with the seals against the surface of the rotor plate.

It has also been the practice in the prior art, to bridge the gap between the floating stator plate and the block by a tube extending from the floating plate into the block. The tube is sealed in the block by a conventional packing gland, and it is free to telescope into the opening of the block and maintain the seal, even though the floating stator plate may have occasion to move axially with respect to the block.

In the structure of the present invention, as was the case with the structure described in the aforesaid patent, since a multiplicity of sampling conduits extend through the block and through the floating stator plate, it is impractical to provide and fit tubes into each of the various apertures between the stator plate and the block, since an approach would be prohibitive from a cost standpoint.

The sealing problem is solved in the valve assembly of the patent, by the provision of a carrier ring or cage, which is fitted between the stator plate and the block. The cage includes apertures aligned with the apertures in the block and stator, and it also includes O-rings in the apertures which serve as bridging and sealing bellows for the assembly.

The valve of the present invention, like the valve assembly described in the aforesaid patent, uses the cage and O-ring concept between the floating stator and block of the valve assembly, so as to perform the desired sealing function.

One form of the improved rotating rotor multiport valve of the present invention is shown in the drawings. The illustrated multiport valve includes a base 10, which may have an essentially cylindrical configuration, and which may be supported by any appropriate means so as to constitute a mount for the valve assembly.

A generally ring-shaped stationary block 12 is mounted on top of the base 10 in coaxial relationship with the base. The block 12 is supported on the base by means, for example, of a plurality of screws, such as the screws 14.

A vertical drive shaft 16 extends through a central aperture in the bottom of the case 10. This shaft may be driven by an appropriate rotary solenoid (not shown), or it may be manually rotated, or it may be driven by any other appropriate means.

A disc-shaped rotor plate 18 (FIGURE 6) is mounted on the shaft 16. The rotor plate is rigidly supported in the base 10 for rotation in the base with respect, for example, to the block 12. The rotor is held against axial movement by means of a thrust bearing 20.

An annular-shaped floating stator plate 40 (FIGURE 5) is positioned in an annular channel formed between the lower portion of the block 12 and the inner peripheral surface of the base 10. The stator plate 40 rests on the top surface of the rotor 18. Rotation of the stator plate with respect to the block 12 is prevented by means of a plurality of dowel pins, such as the pins 42. These pins extend axially into the stator 40 and into the block 12. The dowel pins permit the stator plate 40 to move axially towards and away from the block 12.

As best shown in FIGURE 6, in the particular embodiment, the rotor plate 18 has a first pair of ports or apertures 22 and 24, and it also has a second pair of ports or apertures 26 and 28, the second pair of apertures being diametrically opposed to the first pair. The apertures 22 and 24 are interconnected by conduit 23, and the apertures 26 and 28 are interconnected by a conduit 27, both these conduits being disposed in the rotor as shown in FIGURES 1 and 6. The rotor may, of course, include more or less pairs of apertures depending upon the number of common conduits which are to be selectively connected to individual conduits in the valve.

The stator plate 40, as shown in FIGURE 5, is provided with a first series of apertures 44, and with a second series of apertures 45, the two series being in concentric relationship. As the rotor plate 18 is turned relative to the stator plate 40, the ports 22 and 24 and the ports 26 and 28, are caused to line up with successive stator apertures 44 and 45 in the first and second series. The stator plate 40 also includes apertures 46 for the dowel pins 42.

The incoming pressure lines are coupled to the block 12, to extend through corresponding radial conduits 50 (FIGURE 3) in the block, and to terminate at corresponding ports 52 in the surface of the block 12. The ports 52 are arcuately disposed, so as to be aligned with the apertures 44 of the outer series in the stator 40 of FIGURE 5.

The particular illustrated embodiment of the invention also includes first and second arcuate common conduits, and these are coupled to radial conduits 51 and 53 in the block 12. The radial conduit 51, for example, terminates in a common arcuate conduit 55 which extends halfway around the block, and which communicates with a series of ports 57 in the surface of the block.

Likewise, the conduit 53 communicates with an arcuate conduit 59 in the block which, in turn, terminates in a plurality of ports 61 in the surface of the block. The ports 57 and 61 are aligned with corresponding apertures 45 in the second series of the stator 40 in FIGURE 4.

The block also includes apertures 63 for receiving the dowel pins 42.

It will be appreciated that as the rotor 18 is turned, the rotor ports 22 and 24 are successively lined up with the block ports 52 and 57, as the rotor ports 26 and 28 are successively lined up with the block ports 52 and 61, and vice versa. It will also be appreciated that, for example, when the rotor ports 22 and 24 are lined up with a particular pair of block ports 52 and 57, the common block conduit 51 is connected to a particular one of the individual block conduits 50. At the same time, the common block conduit 53 is coupled to another selected one of the individual block conduits 50.

Therefore, as the rotor turns, different ones of the individual block conduits 50 are coupled to the common block conduit 51, and different ones of the individual block conduits 50 are coupled to the common block conduit 53. This provides a selective fluid switching to the conduits 50 by any instrumentalities coupled to the common "poles" 51 and 53. This selective switching is achieved in the illustrated embodiment of the invention by the mating of particular ports in the rotor and block components of the valve, so as to facilitate the sealing problem.

The assembly also includes a flexible bellows which bridges the gap between the stator 40 and the block 12, and which uses O-rings, as will be described, in order to provide the desired high pressure sealing.

In order to perform the aforesaid high pressure sealing function, an annular cage or ring 70 (FIGURE 4) is interposed between the block 12 and the stator plate 40. The cage ring 70 has a first series of apertures 72 arcuately disposed around the ring, and it also includes a second series of apertures 74 likewise arcuately disposed around the ring. These apertures are aligned with the corresponding ports 52, 57 and 61 in the block 12, and apertures 44 and 45 in the stator 40. A pair of O-rings 76 is disposed in each of the apertures 72 and 74 to perform the aforesaid bellows-like sealing function. The dowel pins 42 extend through apertures 78 in the cage ring 70.

During the operation of the assembly, the stator 40 is free to move axially back and forth with respect to the block 12 along the dowel pins 42, as noted above. The pressure in the conduits 50 creates a force between the stator 40 and the rotor 18. Because the rotor 18 is rigidly supported by the thrust bearing 20 against axial movement in the base 10, the force tends to move the stator 40 against the surface of the block 12 and away from the rotor, and this force is essentially balanced by a force created by the air pressure which tends to move the stator against the rotor.

In addition, the bellows effect of the O-rings 76 in the cage 70 serves to bias the stator 40 against the face of the rotor 18 so as to maintain a bridging seal between the block and the stator in the presence of axial movements of the stator relative to the block along the dowel pins 42.

The cage ring 70 serves to reinforce the O-rings against radial expansion, except over the minimal gap area between the stator and the block, so that extremely high pressures can be withstood by the O-rings while maintaining a fluid-tight joint.

Examples of different types of fluid switches which may be constructed in the practice of the invention are shown in FIGURE 7.

Figure 7E:
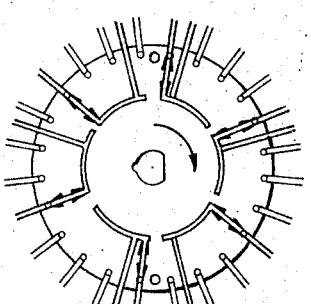
Figure 7B:
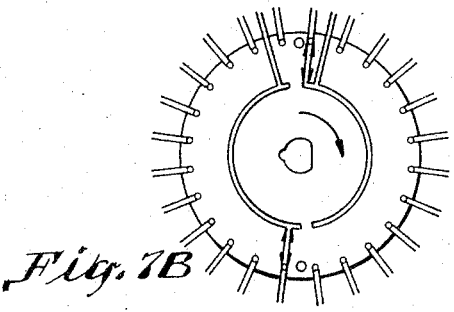
Figure 7F:
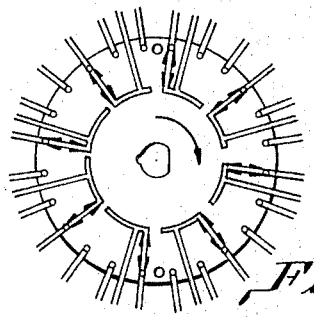
Figure 7C:
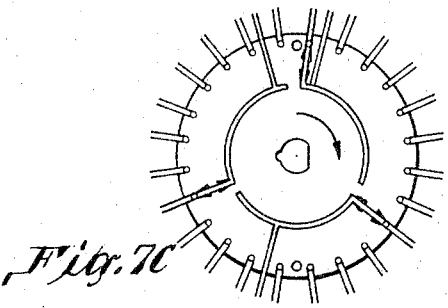
Figure 7G:
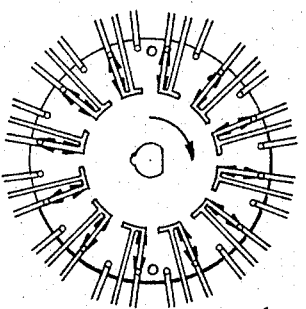
Figure 7D:
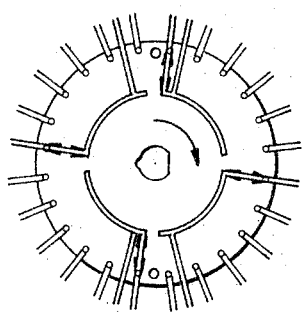
Figure 7H:
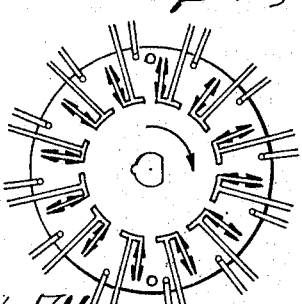

For example, a single "pole"-twenty-four "throw" fluid switch is shown in FIGURE 7A; a two "pole"-twelve "throw" switch is shown in FIGURE 7B; a three "pole"-eight "throw" switch is shown in FIGURE 7C; a four "pole"- six "throw" switch is shown in FIGURE 7D; a six "pole"-four "throw" switch is shown in FIGURE 7E; an eight "pole"-three "throw" switch is shown in FIGURE 7F; a twelve "pole"-two "throw" switch is shown in FIGURE 7G; and a twelve "pole"-one "throw" switch is shown in FIGURE 7H.

The invention provides, therefore, an improved fluid valve switching assembly which is simple, compact and rugged in its construction, and which is capable of performing its switching function without leakage problems.

What is claimed is:

1. A valve assembly including:
   a stationary block member having an annular surface and further having a plurality of individual conduits extending therethrough and terminating at said annular surface in a first series of arcuately disposed ports extending around a first circular path on said annular surface, and said block further having at least one common conduit extending therethrough and terminating at said annular surface in a second series of arcuately disposed ports extending around a second circular path on said annular surface displaced radially from said first circular path; and
   a rotatable rotor member having a surface disposed in facing relationship with said annular surface of said block and having at least one passageway therein terminating in a pair of ports at said surface thereof, said rotor ports being respectively positioned to move around said first and second circular paths and to become aligned with corresponding pairs of said block ports of said first and second series as said rotor is turned relative to said block.

2. The valve defined in claim 1 in which said conduits extend through said stationary block member in a radial direction.

3. The valve defined in claim 1, and which includes an annular stator member interposed between said block and said rotor member, said stator member having a plurality of apertures extending therethrough in respective axial alignment with said block ports of said first and second series; and a plurality of dowel pins extending axially into said block member and into said stator member to prevent relative rotation between said stator member and said block member and yet to permit axial movement therebetween; and an annular cage member interposed between said block and said stator member, said cage member having a plurality of apertures extending therethrough in respective axial alignment with said apertures in said stator member; and O-rings disposed in the apertures of said annular cage member.

References Cited

UNITED STATES PATENTS

| | | | |
|---|---|---|---|
| 2,827,924 | 3/1958 | Towler et al. | 251—283 XR |
| 2,911,008 | 11/1959 | Du Bois | 137—625.18 |
| 3,246,667 | 4/1966 | Pemberton | 137—312 |

ROBERT W. MICHELL, *Primary Examiner.*

R. I. SMITH, *Assistant Examiner.*

U.S. Cl. X.R.

137—625.12